July 26, 1960 L. D. RAMPINO ET AL 2,946,742
MILD HYDROGENATION OF CATALYTIC REFORMATE
Filed Jan. 2, 1958 3 Sheets-Sheet 3

INVENTORS
MILTON J. GORHAM
LOUIS D. RAMPINO
BY
AGENT

# United States Patent Office 2,946,742
Patented July 26, 1960

2,946,742

MILD HYDROGENATION OF CATALYTIC REFORMATE

Louis D. Rampino and Milton J. Gorham, Concord, Calif., assignors to Tidewater Oil Company, a corporation of Delaware Filed Jan. 2, 1958, Ser. No. 706,682

11 Claims. (Cl. 208—143)

This invention relates to the catalytic reforming of naphtha fractions to produce gasoline constituents of high antiknock quality. More particularly, it relates to a combination of catalytic reforming with a novel process for obtaining gasoline with greatly improved storage stability and less tendency to form gums as compared with previous high-octane catalytically reformed gasolines.

Progress in the automotive industry has resulted in the development of gasoline engines of higher and higher compression ratios requiring gasoline fuels of correspondingly higher antiknock properties or octane rating. To meet this demand, the petroleum industry has developed various processes for producing gasoline of increased octane rating. One of the more efficient of such processes (and the one concerned in the present invention) is known as catalytic reforming, wherein low-octane naphtha is contacted under pressure in the vapor phase with a suitable catalyst at temperatures above 800° F. in the presence of substantial volumes of hydrogen. A common type of catalyst used for catalytic reforming is platinum supported on a suitable carrier such as specially prepared alumina containing chloride or fluoride or both or specially prepared silica-alumina. Several such platinum catalysts are marketed which will produce 85 to 90 clear "research" octane number (ASTM Method D 908-53) reformate under operating conditions sufficiently mild that the catalyst can be used for extended periods of time without "regeneration" to remove carbon formed by undesirable reactions.

More recent developments in the automobile industry have created a need for gasoline having a research octane number substantially above 90 (before the addition of tetraethyllead or other anitknock compound) and preferably above 96. To meet this requirement by catalytic reforming processes now in use, it has been necessary to increase the severity of operating conditions to an extent that a substantial amount of hydrocracking and polymerization occurs. Under these severe conditions a considerable portion boiling above about 400° F. is usually produced; this portion is almost entirely aromatic and therefore has a very high octane number. However, this portion generally contains substantial amounts of dicyclic aromatics such as naphthalene, the two methyl naphthalenes, and the several dimethyl naphthalenes. The presence of these dicyclic aromatics in gasoline, even in low percentages (such as 1% or even less) has been considered heretofore to be deleterious and has been regarded as the cause of varnishes, gums, and lacquers in engines using such fuel.

Previously, it has been proposed to remove these supposedly deleterious materials by rerunning the severe reformate so as to cut out the heavy bottoms. This, however, requires additional equipment, a substantial capital expenditure, and the continuing expense of heating the material. Moreover, the advantages of rerunning are illusory. When fresh, the rerun stock has less tendency to form gums than fresh reformate which has not been rerun. However, after it has aged a few weeks, the rerun stock has been found to have a greater tendency to form gum than similarly aged reformate that was not rerun.

We have found that superior results can be obtained by subjecting the severe reformate to a very mild hydrogenation. It is interesting and unexpected to find that the mild hydrogenation results in induction system ratings approximately equal to or better than those of the fresh rerun material from which the supposedly deleterious materials were eliminated. Of equal interest and surprise is the fact that our mildly hydrogenated reformate containing the bottoms has a storage stability superior to both the original reformate and the rerun reformate and a somewhat lower octane loss than the rerun material. All this is quite surprising in view of the fact that analysis appears to indicate that the supposedly deleterious dicyclic aromatics are still present in substantially the same quantity as before. Whether the mild hydrogenation removes or reconstitutes some agent that reacted with these dicyclic aromatics to form gums or whether the mild hydrogenation renders innocuous some completely different gum-forming constituent, we do not know at present, but the results are impressive. Moreover, the process of this invention is substantially less expensive than rerunning and requires much less capital investment. Also, there is no loss in product volume after hydrogenating, as there is where the bottoms are removed.

A fact worth remarking is that heretofore hydrogenation of reformate was disfavored, because (1) the dicyclic aromatics presumed to be the cause of the gum were not considered to be changeable by hydrogenation at pressures lower than about 1000 p.s.i., and (2) hydrogenation was considered certain to reduce the octane number by saturating the remaining olefins into lower-octane paraffins. However, we have found that mild hydrogenation under the right conditions substantially eliminates the gum-forming constituents and improves the storage stability of the gasoline but gives only a negligible lowering, if any, in octane number.

The exact conditions under which hydrogenation should be carried out may vary under circumstances which are explained in the course of this specification. However, in general it may be said that the mild hydrogenation may be (and, for economic reasons, preferably is) carried out at substantially the same pressure as that used in the reforming operation, and that excellent results may be obtained by hydrogenating at temperatures in the neighborhood of 500° F. to 600° F., with a space velocity (LHSV) of approximately 30, and hydrogen consumption of around 20 to 30 s.c.f./bbl. or less. Temperature as low as about 450° F. may be used with somewhat less desirable results. Commercial cobalt molybdate is the presently preferred catalyst. Under such circumstances the octane number loss may be kept down to as low as 0.1 or even lower, for example, while the gum-forming tendencies are reduced by very significant margins.

The effect of mild hydrogenation in the present invention is especially surprising in view of the fact that it is conventional to precede the step of catalytic reforming with a step of severe hydrogenation for the purpose of prolonging the life of the reforming catalyst by removal of arsenic, sulfur, nitrogen, and other poisons for the catalyst, all of which can be removed by rather severe hydrogenation prior to catalytic reforming. But the present invention is not concerned with hydrodesulphurization or the removal of other catalyst poisons. In fact, the charge that is catalytically reformed prior to the novel mild hydrogenation step of our invention will usually have no arsenic and negligible sulphur and nitrogen content, and even if this were not the case, the product emerging from the catalytic reformer would still have a sulphur content substantially less than 1/100 of 1% and even less arsenic and nitrogen.

We also recognize that it is old to hydrogenate catalytically "cracked" naphtha, where the bromine numbers before hydrogenation are many times greater than in catalytically reformed naphtha fractions. For example, the catalytically "reformed" naphtha used in our invention normally has a bromine number in the order of about 4, whereas, the bromine numbers of catalytically "cracked" naphthas are rarely less than 20 or 30 and may be more than 100. In fact, catalytically cracked naphtha often has a bromine number as high as 140. Hydrogenation of such material is practiced, as in the aforementioned step prior to catalytic reforming, to reduce the sulphur content, which may be very high, in the order of 0.3% to 0.5%, many times as great as in the material of the present invention, which has been desulphurized and subjected to catalytic reformation (as distinct from catalytic cracking) and therefore has a quite low bromine number and practically no sulphur content. Normally it might be thought that hydrogenation of such a fraction would be useless since there is no sulphur to take out and since the remaining olefins in the naphtha are desirable constituents whose hydrogenation would substantially lower the octane number of the fuel.

While we are not aware of the exact chemical mechanism of our process, the quality of our improved fuel speaks for itself. Moreover, it appears to be beneficial to use our process even when the bottoms materials have already been removed by fractionation or when they are to be later removed by fractionation subsequently to the mild dehydrogenation step which our invention proposes.

Other objects and advantages of the invention will appear from the following description of preferred embodiments thereof.

Figure 1:
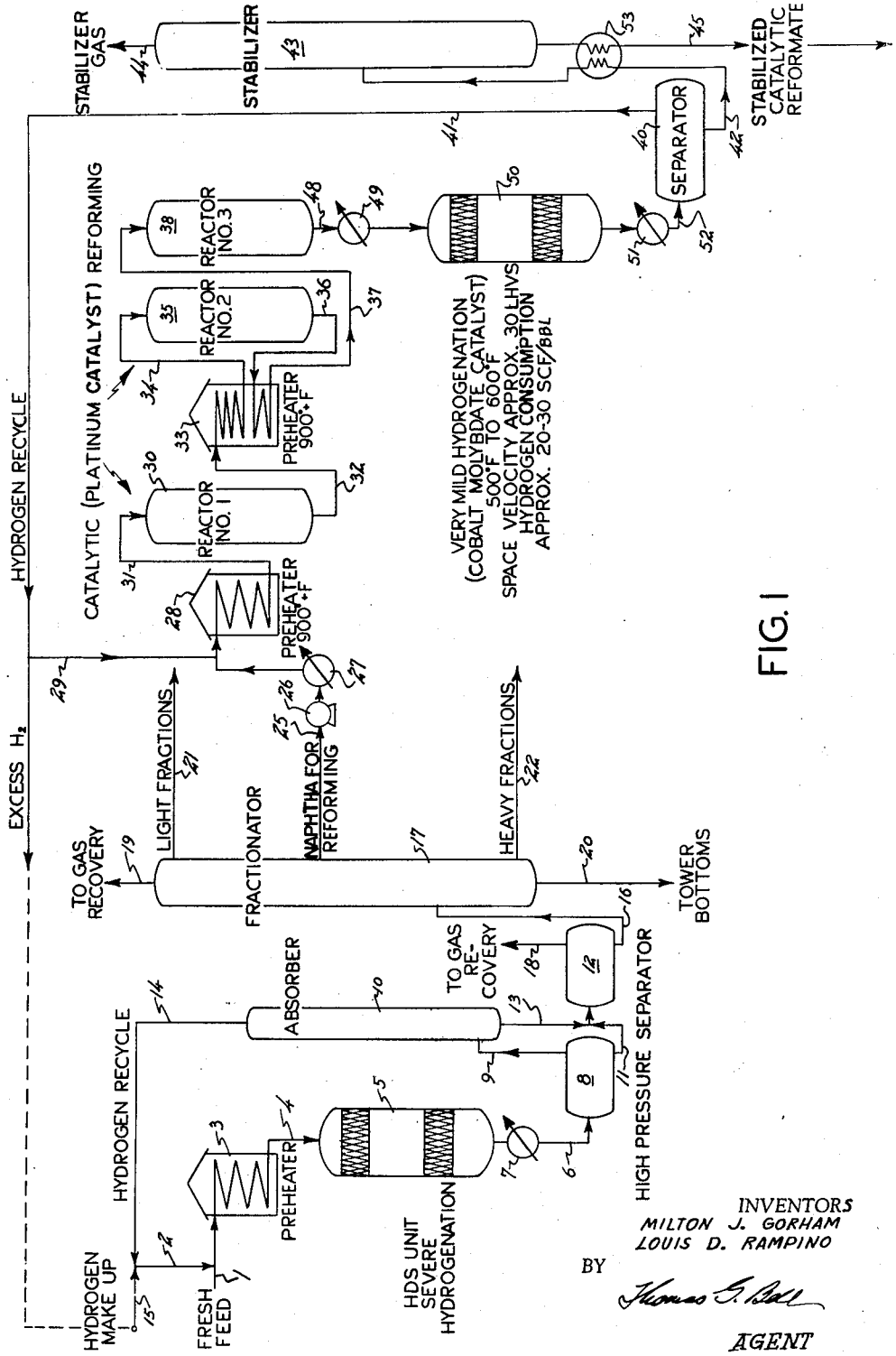
Fig. 1 is a flow diagram of a portion of a typical catalytic reforming process, preceded by hydrodesulfurization and subsequently incorporating a process embodying the principles of this invention.

In the illustrative example shown in Fig. 1, the naphtha fed to the catalytic reformer is hydrodesulphurized prior thereto. By way of example only, fresh feed 1 is shown sent along with hydrogen from line 2 through a preheater 3, to raise the temperature of the feed preheater to a suitable level and then the preheated stock in line 4 is fed to a hydrogenation unit 5. For a unit 5 using cobalt-molybdena-alumina catalyst, the reactor 5 will be at a temperature of about 750° F. to 850° F. and at a pressure of about 500–1000 p.s.i.g. Hydrogenation in the unit 5 reduces the sulphur content of the feed to a negligible amount and also saturates unsaturated hydrocarbons.

The hydrodesulphurized stock in line 6 may then be cooled by a heat exchanger 7 and sent to a high-pressure flash separator 8 where rich gas is flashed off in line 9 as feed to an absorber tower 10. Condensate in line 11 goes from the high-pressure separator 8 to a low-pressure separator 12 where it is combined with rich oil in line 13 from the absorber tower 10. Hydrogen from the absorber 10 may be recycled through lines 14 and 2, hydrogen makeup being added through line 15.

The condensate in line 16 is fed from the low-pressure separator 12 to a fractionation tower 17, while the gas taken from the separator 12 at line 18 may be sent to gas recovery. Gas for recovery is similarly drawn off by line 19 from the fractionator 17. Bottoms may be withdrawn from the fractionator 17 through line 20; light fractions may be drawn off through line 21 and heavy fractions through line 22.

Naphtha charge for the catalytic reformer passes from the fractionator 17 via line 25, a pump 26, and a heat exchanger 27, to a preheater 28, where the temperature is raised more than 800° F., almost always more than 900° F., and usually about 950° F. at 500 p.s.i.g. Hydrogen from line 29 is preferably added before preheating, and the mixture of naphtha and hydrogen is then fed to a first reactor 30 through line 31. (The hydrodesulphurization step, indicated by numerals 3–23, may be omitted where the sulphur and nitrogen content of the naphtha 1 is low and where the naphtha 1 is substantially arsenic free or where there exist suitable means for regenerating the reforming catalyst. In this event the naphtha 1 and 25 would be identical.)

Platinum supported on alumina or silica may be the catalyst in the reactor 30. Normally there is more than one reactor, with substantially identical conditions therein; by way of example, we show herein three reactors, the partially reformed material from the first reactor 30 being fed through line 32 to a reheater 33 (to raise the temperature again after it has dropped in the endothermic reaction in the reactor 30) and thence via line 34 to a second reactor 35. From the second reactor 35 the material is returned by line 36 to the reheater 33 (or to a separate reheater) and charged by line 37 to a third reactor 38.

All these preceding steps are normal practice. But the normal procedure from here on is to feed the reformate from the third reactor 38 to a separator 40, whence hydrogen is recycled via lines 41 and 29. The condensate from the separator 40 is fed through line 42 to a stabilizer 43, whence gas is taken off through line 44 and stabilized reformate is sent through line 45 to storage or blending.

In the present invention, however, we feed the reformate coming from the final reactor 38 through line 48 and a heat exchanger 49 to a hydrogenation reactor 50, wherein very mild conditions obtain. Preferably the reformate so passed still contains its excess hydrogen; in other words, preferably the mild hydrogenation 50 precedes the separator 40. Preferably, the heat exchanger 49 reduces the temperature of the reformate to about 500°–600° F. prior to hydrogenation, a second heat exchanger 51 in line 52 after the hydrogenator 50 being used to prepare the reformate for the separator 40. Either heat exchanger 49 or 51 or both may be the other side of the heat exchanger 27 or some other heat exchanger in the system, in order to use the heating and cooling steps with maximum efficiency, for example, in the manner of the heat exchanger 53 where the stabilized reformate in line 45 heats the cooled condensate in line 42.

In the preferred process illustrated in Fig. 1 certain things should be noted particularly: (1) there is no separation of hydrogen from the reformate before hydrogenation; the hydrogen excess resulting from reformation is used (but only partially and in fact in small percentages of the hydrogen present) in the mild hydrogenation step; (2) the pressure (normally about 500 p.s.i.g.) used in the reforming reactors is preferably maintained through the hydrogenation step, so that no pressure reduction regulator or compressor need be added to the system in order to carry out the present invention; (3) the only equipment really added is the cobalt-molybdate catalyst bed 50, a relatively inexpensive installation; and (4) as stated earlier, the heat given up in the heat exchangers 49 and 51 is preferably utilized elsewhere in this same system, e.g., in the heat exchanger 27.

The general process now being understood in its relation to conventional catalytic reforming, it will be pointed out that normally the naphtha fed to the reformer *has already been hydrogenated*, usually severely, to remove the sulphur, nitrogen, and arsenic and that any sulphur, nitrogen, or arsenic remaining is removed by the platinum in one of the three reactors 30, 35, and 38. Even if the naphtha 25 is not hydrogenated before reformation, there is still no sulphur or arsenic in the feed to the hydrogenator 50, yet the process is in all events useful in enhancing the storage life of the reformate, in preventing later development of gum-forming constituents, and in obtaining cleaner engine performance—all this without any substantial reduction of the research octane number and whether or not the bottoms are removed from the reformate prior to or subsequent to the mild hydrogenation step of this invention.

Figure 2:
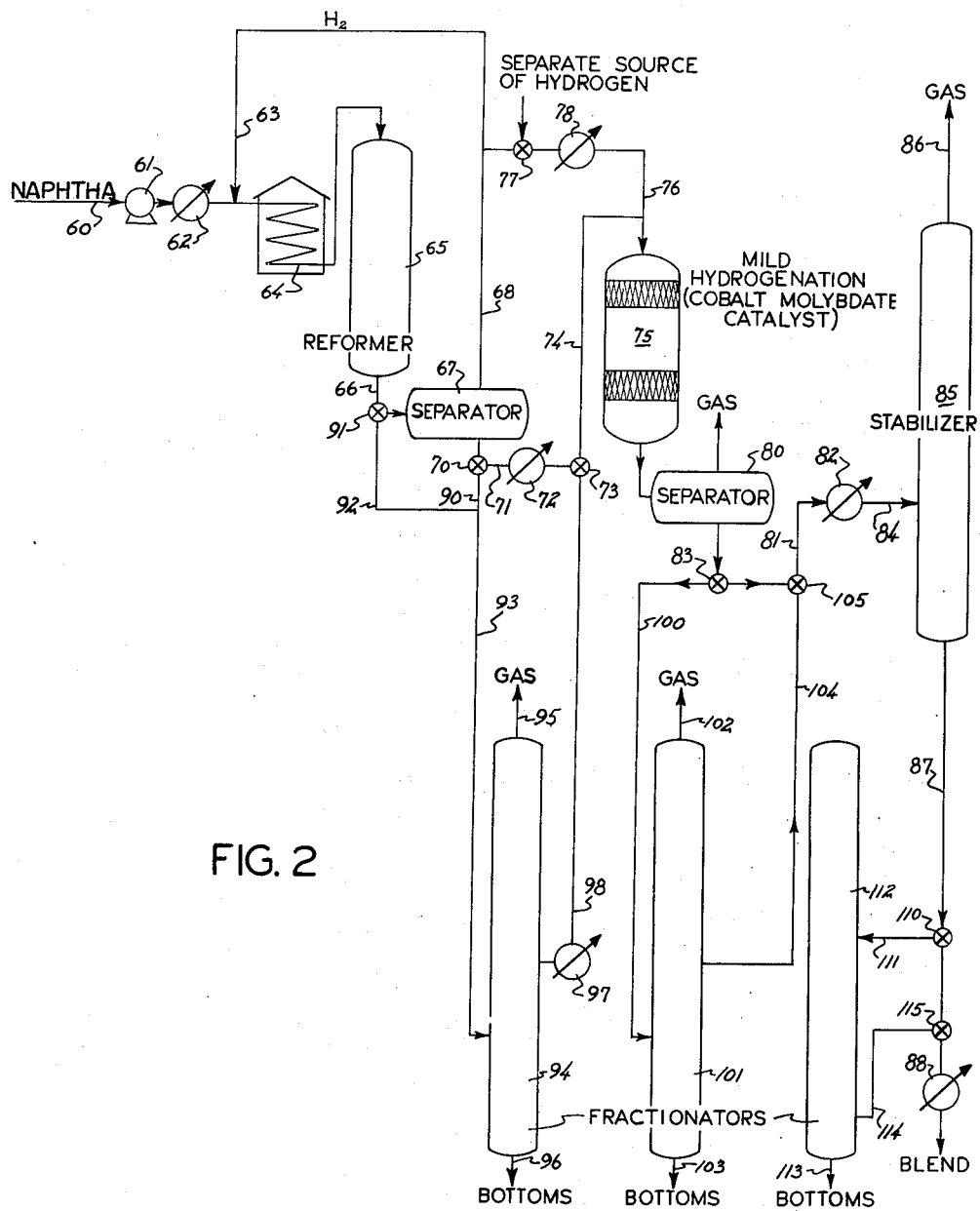
Fig. 2 is a simplified diagram of a modified process also embodying the principles of this invention, wherein the hydrogen is separated from the reformate and hydrogen is added again at the step of hydrogenation.

Modifications are shown in Fig. 2, where the diagram is greatly simplified. Naphtha, whether previously hydrodesulphurized or not, is fed through line 60, pump 61, and heat exchanger 62, mixed with hydrogen from line 63, heated to the desired level in heater 64, and treated in a catalytic reformer 65, here shown condensed into one block, though the block may represent one or several units. Then the reformate in line 66 is fed to a separator 67 where the hydrogen is removed through line 68.

The condensate from the separator 67 may be fed through valve 70, line 71, heat exchanger 72, valve 73, and line 74 into a hydrogenation reactor 75, operated under the conditions described under Fig. 1, except that hydrogen is fed thereto via line 76, valve 77, and heat exchanger 78 in the desired ratio, either from line 68 or from a separate source of hydrogen via line 79.

After hydrogenation as before, the mildly hydrogenated reformate may be fed via separator 80, line 81, heat exchanger 82, and line 84 into a stabilizer 85, as in Fig. 1, where the gas is taken off via line 86 and stabilized reformate via line 87 and heat exchanger 88.

As also shown in Fig. 2, the reformate may be fractionated either before or after hydrogenation or both, in order to meet end-point specifications of certain consumers or for other reasons. Thus, before hydrogenation, some runs may conduct the reformate from the separator 67 via the valve 70 and line 90, or even direct from the reformer 65 via valve 91 and line 92, to line 93 and into a fractionator 94, whence gas may be removed via line 95, bottoms via line 96, and the remainder returned by heat exchanger 97 and line 98 to the valve 73 and line 74 for introduction to the hydrogenator 75.

Alternatively, or in addition if desired, the mildly hydrogenated reformate produced by this invention may be sent via valve 83 and line 100 into a fractionator 101, whence gas is removed by line 102, bottoms by line 103. The remainder may then be sent via line 104, valve 105, line 81, and heat exchanger 82, into line 84 and the stabilizer 85. A further alternative is fractionation after stabilization. The stabilized reformate may be sent from line 87 via valve 110 and line 111 into fractionator 112 from which the bottoms may be removed through line 113. The overhead may be taken out through line 114 and returned to the line 87 through valve 115. Any or all of these fractionation steps may also be used in the process of Fig. 1, if desired.

Experiments made in accordance with the processes of Figs. 1 and 2 show further interesting features of the invention. Two different reformates were used in these experiments, made under similar conditions but at different times. For purposes of this discussion, they are referred to as "Reformate A" and "Reformate B." In both instances, a platinum reforming catalyst was used. Pertinent data is shown in Table I.

TABLE I

*Data on reformate*

| Operating Conditions of Reforming | Reformate A | Reformate B |
|---|---|---|
| Temperature: | | |
| (Max.) | 974 | 980 |
| (Min.) | 910 | 916 |
| (Avg.) | 940 | 947 |
| Pressure (p.s.i.a.) | 500 | 500 |
| Space Velocity (LHSV) | 2 | 2 |
| $H_2$ Recycle Rate (s.c.f./bbl.) | 6,500 | 6,500 |
| Yield (Vol. percent) | 85.5 | 83.5 |

| Analysis | Charge | Reformate A | Reformate B |
|---|---|---|---|
| Bromine No | 0.19 | 3.5 | 4.5 |
| FIA: | | | |
| Aromatic | 9 | 59 | |
| Olefin | 1 | 2 | |
| Saturates | 90 | 39 | |
| Percent Sulfur | 0.01 | | |
| Basic Nitrogen | Nil | | |
| ASTM Gum | | 10.8 | 7.8 |
| Octane Number: | | | |
| F-1 Clear | | 94.3 | 94.6 |
| F-1 + 3.0 cc. TEL | | 100.0 | |
| Distillation: | | | |
| IBP | 188 | 94 | |
| 5 | 225 | 144 | |
| 10 | 236 | 180 | |
| 20 | 250 | 220 | |
| 30 | 261 | 244 | |
| 40 | 273 | 264 | |
| 50 | 285 | 280 | |
| 60 | 298 | 295 | |
| 70 | 310 | 314 | |
| 80 | 327 | 330 | |
| 90 | 346 | 362 | |
| 95 | 359 | 410 | |
| E.P. | 391 | 428 | |

Due to aging of reforming catalyst, Reformate B apparently required higher temperatures to attain the same octane as Reformate A with more hydrocracking and lower yield.

Mild hydrogenation was carried out separately on Reformates A and B using cobalt molybdate in the form of $\frac{1}{16}''$ pellets. The fresh catalyst may be preconditioned, if desired, by desulfurizing a small amount of stock containing sulfur compounds, in this case, heavy catalytically cracked naphtha. A pressure of 500 p.s.i. was used throughout, the temperature and the liquid hourly space velocity being varied.

Hydrogen consumption was measured to be about 20–30 s.c.f./bbl. including solution losses. Since solution losses are probably about 20 s.c.f./bbl., the chemical consumption appears to be under or about 10 s.c.f./bbl. The mole ratio of hydrogen to hydrocarbon was 6 to 1, the normal ratio for reformer effluent.

The data obtained from hydrogenation runs of Reformates A and B, respectively, are shown in Tables II and III.

TABLE II

*Data obtained on hydrogenation runs of Reformate A*

| Run No. | Operating Conditions | | Br₂ No. | ASTM Gum | Octane No. | |
|---|---|---|---|---|---|---|
| | Temp., °F. | LHSV | | | clear | +3.0 cc. |
| Charge (Reformate A) | | | 3.5 | 10.8 | 94.3 | 100.0 |
| 1 | 500 | 25 | 2.6 | 0.0 | 94.2 | 99.9 |
| 2 | 600 | 25 | 1.9 | 0.6 | 94.1 | 99.9 |
| 3 | 500 | 10 | 1.7 | 1.0 | 93.9 | 99.9 |
| 4 | 600 | 10 | 0.7 | 5.8 | 93.8 | 99.9 |
| 5 | 700 | 4 | 0.4 | 14.8 | 93.7 | 99.7 |
| 6 | 400 | 5 | | 4.8 | | |
| 7 | 400 | 15 | | 15.0 | | |
| 8 | 425 | 5 | | 0.2 | | |
| 9 | 425 | 15 | | 0.2 | | |
| 10 | 450 | 5 | | 1.6 | | |
| 11 | 450 | 15 | | 1.8 | | |
| 12 | 500 | 5 | | 0.8 | | |
| 13 | 500 | 10 | | 2.6 | | |
| 14 | 500 | 10 | | 0.8 | | |
| 15 | 500 | 15 | | 1.4 | | |
| 16 | 600 | 5 | | 8.0 | | |
| 17 | 600 | 15 | | 3.6 | | |
| 18 | 600 | 25 | | 4.0 | | |
| 19 | 700 | 5 | | 2.8 | | |
| 20 | 700 | 15 | | 3.4 | | |
| 21 | 700 | 25 | | 1.8 | | |

TABLE III

*Data obtained on hydrogenation runs of Reformate B*

| Run No. | Operating Conditions | | Br₂ No. | ASTM Gum | Induction System Deposit (Blended), mg./l. |
|---|---|---|---|---|---|
| | Temp., °F. | LHSV | | | |
| Charge (Reformate B) | | | 4.5 | 7.8 | 30.8 |
| 22 | 700 | 15 | 0.7 | 9.4 | 22.7 |
| 23 | 500 | 15 | 1.4 | 1.2 | 17.6 |
| 24 | 450 | 10 | 1.3 | 4.2 | 23.6 |
| 25 | 700 | 60 | 2.0 | 5.8 | 18.3 |
| 26 | 600 | 45 | 2.1 | 7.8 | 17.7 |
| 27 | 500 | 30 | 1.8 | 0.4 | 17.2 |
| 28 | 450 | 20 | 1.7 | 0.4 | 21.3 |
| 29 | 500 | 45 | 2.5 | 4.6 | 21.4 |

As shown in Table IV, the more complete the hydrogenation, as measured by loss in bromine number, the greater the loss in octane number.

TABLE IV

*Octane loss from hydrogenation*

| | Bromine No.[1] | Octane No. | Octane No. Loss |
|---|---|---|---|
| Raw Reformate | 3.5 | 94.3 | |
| Hydrogenated Reformate (1) | 2.6 | 94.2 | 0.1 |
| Hydrogenated Reformate (2) | 1.9 | 94.1 | 0.2 |
| Hydrogenated Reformate (3) | 1.7 | 93.9 | 0.4 |
| Hydrogenated Reformate (4) | 0.7 | 93.8 | 0.5 |
| Hydrogenated Reformate (5) | 0.4 | 93.7 | 0.6 |

[1] Titration using KBr—KBrO₃ solution. Ref.: Frances, Ind. and Eng. Chem. 18, p. 821 (1926); Lewis and Bradstreet, ibid., Anal. Ed. 12, 387 (1940).

Thus, to minimize octane loss it is desirable to use as mild hydrogenation conditions as will give adequate improvement in product quality.

As shown in Table III, a series of runs on Reformate A were made at temperatures of 450°, 500°, 600°, and 700° F. and at four levels of hydrogenation. The level of hydrogenation was controlled by varying the space velocity.

Glass manifold deposits obtained with blends of this material are shown in Table V. The blend containing 50% mildly hydrogenated reformate and 50% light catalytically cracked gasoline (Table VI) was used to simulate commercial gasoline and give more typical vaporization in the glass manifold apparatus.

TABLE V

*Glass manifold deposits[1] of Reformate B Hydrogenated at various temperatures and space velocities*

| Reduction in Br₁ No. | Bromine No. | Reactor Temp., °F. | LHSV | Glass Manifold Deposits, mg./liter |
|---|---|---|---|---|
| 85% | 0.7 | 700 | 15 | 22.7 |
| 69% | 1.4 | 500 | 15 | 17.6 |
| 71% | 1.3 | 450 | 10 | 23.6 |
| 55% | 2.0 | 700 | 60 | 18.3 |
| 53% | 2.1 | 600 | 45 | 17.7 |
| 60% | 1.8 | 500 | 30 | 17.2 |
| 62% | 1.7 | 450 | 20 | 21.3 |
| 44% | 2.5 | 500 | 45 | 21.4 |
| Raw Reformate | 4.5 | | | 30.8 |

[1] Test Method: Evaluating Gasolines for Induction System Gums C. C. Moore, J. L. Keller, W. L. Kent, F. S. Liggett, Union Oil Company of California, presented at SAE National Fuels and Lubricants Meeting, Tulsa, Oklahoma, November 4-5, 1954.

The lowest glass manifold deposit rating was obtained with reformate hydrogenated at 500° F. to 60% bromine number reduction.

TABLE VI

*Properties of light catalytically cracked gasoline used in blend for induction system deposit test*

Distillation, ° F.:
```
  I.B.P. _____ 98
  10 _____ 125
  50 _____ 160
  90 _____ 232
  E.P. _____ 292
Br₂No. _____ 140
ASTM gum _____ 0.8
Peroxide No. _____ 0.3
Sulfur _____ .10
Nitrogen _____ .005
```

Figure 3:
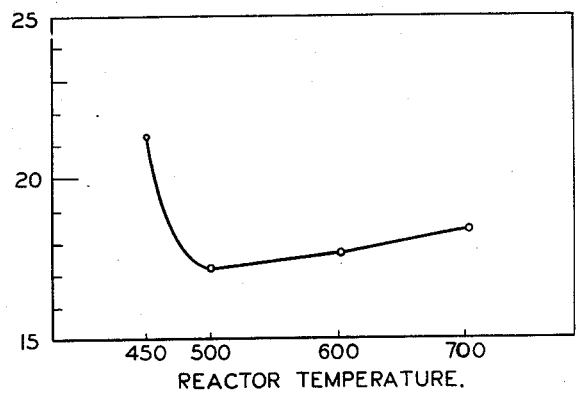
Fig. 3 is a graph plotting the glass manifold deposit rating of hydrogenated reformate against the reactor temperature of the hydrogenation unit.

Plotting glass manifold deposit rating vs. reactor temperature at this level of hydrogenation (55-60% bromine number reduction) gives a low at 500° F. (See Fig. 3.)

Figure 4:
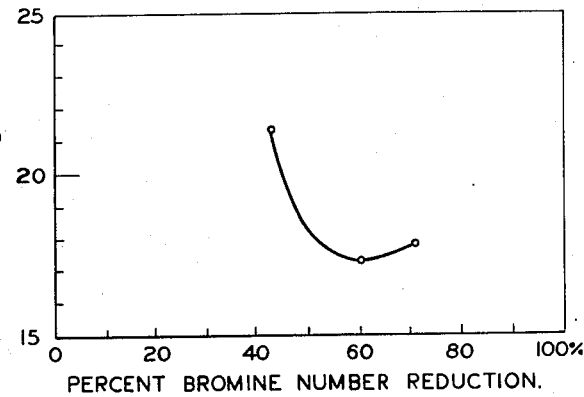
Fig. 4 is a graph plotting the glass manifold deposit rating of hydrogenated reformate against the percent reduction of the bromine number by hydrogenation.

Plotting glass manifold deposit rating vs. percent bromine number reduction at 500° F. reactor temperature gives a low at about 60% reduction (see Fig. 4).

Figure 5:
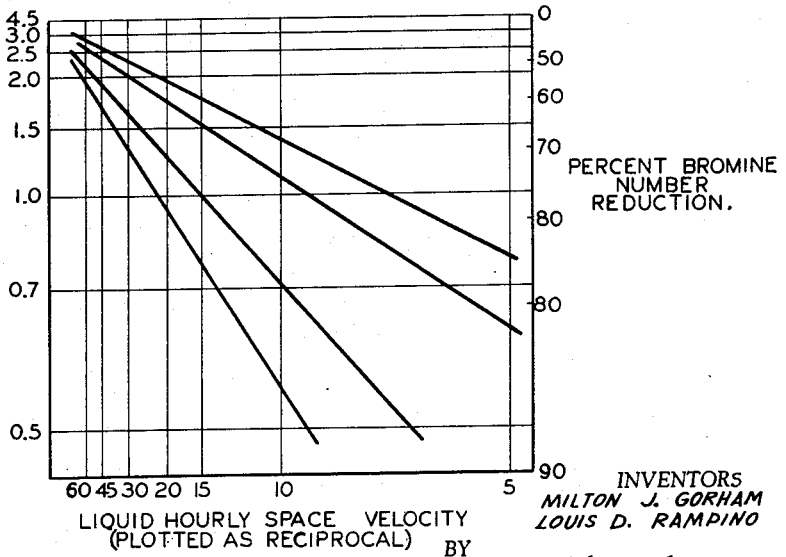
Fig. 5 is a graph plotting the reciprocal of the percent reduction of the bromine number against the reciprocal of the liquid hourly space velocity.

The bromine number reduction appeared to follow a second order reaction rate. An approximate straight line was obtained by plotting the reciprocal of the bromine number against the residence time or the reciprocal of the space velocity, as shown in Fig. 5. From this, the temperature and space velocity necessary for a given conversion can be approximated quite readily.

From the foregoing data and drawings, the optimum conditions appear to be:

```
Temperature, ° F. _____ 500.
Percent reduction in bromine No. _____ 60.
Space velocity, LHSV _____ 30 approx.
Hydrogen consumption, s.c.f./bbl. _____ 20-30 or less.
```

Octane number loss under optimum conditions is about 0.1 RON.

The ASTM gum (ASTM Method D 381-54T) on high severity untreated reformate is relatively high. Values of 7.8-10.8 were obtained on the reformate used in these experiments. A summary of ASTM gum data is presented in Table VI. Lowest gums were obtained in the range from 425° to 500° F. reactor temperature.

TABLE VII

*ASTM gum content at various reactor temperatures*

| Reactor Temp., °F. | No. of Runs | High | ASTM Gum Low | Average |
|---|---|---|---|---|
| 400 | 2 | 15.0 | 4.8 | 9.9 |
| 425 | 2 | 0.2 | 0.2 | 0.2 |
| 450 | 4 | 4.2 | 0.4 | 2.0 |
| 500 | 9 | 4.6 | 0.0 | 1.4 |
| 600 | 6 | 8.0 | 0.6 | 5.0 |
| 700 | 6 | 14.8 | 1.8 | 6.3 |

Comparison between hydrogenated reformate and redistilled reformate with respect to octane number loss, and induction system deposits (on fresh samples) and peroxide formation on storage is made in Table VII.

TABLE VIII

*Comparison of untreated, hydrogenated, and redistilled reformate*

| | Raw Reformate | Hydrogenated Reformate (Optimum) | Redistilled Reformate 97% OH |
|---|---|---|---|
| Octane No. Loss | | 0.1 | 0.6 |
| Induction System Deposits | 80.8 | 17.2 | 17.2 |
| Peroxide No.: Storage @ 140° F., 500 p.s.i., O₂ for— | | | |
| 0 days | 0.1 | 0.1 | 0.1 |
| 2 days | 0.6 | 0.4 | 1.9 |
| 4 days | 1.3 | 0.9 | 8.1 |
| 7 days | 3.4 | 2.2 | 22.2 |

These data show that hydrogenation of reformate leads to considerably reduced induction system deposits. Freshly redistilled reformate shows approximately the same reduction in deposits; however, hydrogenated reformate is much more resistant to peroxide formation on storage than redistilled reformate. For this reason, hydrogenation is shown to be a superior method of reducing the gum-forming tendency of reformates.

Table IX compares the glass manifold deposits obtained on redistilled and hydrogenated reformates after aging for 1 month at 110° F. using air. Deposit data were obtained on blends containing 50% of reformate and 50% of the same light catalytic gasoline.

Also, as Table IX shows, the tendency for redistilled reformate to form deposits on storage can be reduced if reformate is hydrogenated either before or after distillation.

TABLE IX

*Glass manifold deposits from aged reformates*

| | Glass manifold deposits, mg. per liter |
|---|---|
| Aged, full-range reformate +50% light catalytic gasoline | 54.2 |
| Aged, 97% overhead reformate +50% light catalytic gasoline | 69.6 |
| Aged, mildly hydrogenated reformate +50% light catalytic gasoline | 22.4 |
| 97% overhead reformate, mildly hydrogenated after redistillation and aged +50% light catalytic gasoline | 20.4 |
| Mildly hydrogenated reformate, distilled to 97% overhead after hydrogenation and aged +50% light catalytic gasoline | 18.6 |

To those skilled in the art to which this invention relates, many changes in construction and widely differing embodiments and applications of the invention will suggest themselves without departing from the spirit and scope of the invention. The disclosures and the description herein are purely illustrative and are not intended in any sense to be limiting.

We claim:

1. A method for improving the storage stability and induction-system cleanliness of a substantially non-olefinic naphtha reformate that has been severely reformed in the presence of platinum catalyst and hydrogen at temperatures above 900° F., with the production of additional hydrogen and under conditions sufficient to maintain the bromine number of the reformate below about 4.5, said method comprising mildly hydrogenating said reformate in the absence of added olefins and in the presence of a hydrogenation catalyst at a temperature between 450° and 600° F., at substantially the same pressure as the catalytic reforming and at a liquid hourly space velocity of approximately 30; said hydrogenation being insufficient to cause a significant reduction in the research octane rating of the reformate.

2. The method of claim 1 wherein the reduction in bromine number of the reformate during the hydrogenation is about 40% to 60%.

3. A method for improving the storage stability and induction system cleanliness of a substantially non-olefinic naphtha reformate that has been severely reformed in the presence of platinum catalyst and hydrogen at temperatures above 900° F., with the production of additional hydrogen and under conditions sufficient to maintain the bromine number of the reformate below about 4.5, said method comprising passing a stream, consisting essentially of said reformate and said additional hydrogen, over a bed of cobalt molybdate catalyst under conditions sufficient to reduce the bromine number of said reformate by about 40% to 60%; said conditions being insufficient to cause a substantial reduction in the research octane rating of said reformate.

4. The method of claim 3 wherein the temperature at the cobalt-molybdate catalyst bed is between 450° and 650° F., the pressure is about 500 p.s.i.a. and the liquid hourly space velocity is approximately 30.

5. A method for improving the storage stability and induction system cleanliness of a substantially non-olefinic naphtha reformate that has been hydrodesulphurized and then severely reformed in the presence of platinum catalyst and hydrogen at above 900° F. and about 500 p.s.i.a., with the production of additional hydrogen, comprising passing said reformate in the absence of added olefins over a bed of cobalt molybdate catalyst in the presence of hydrogen at a mole ratio of about 6 to 1 of hydrogen to hydrocarbons, at about 500° F., 500 p.s.i.a., and at a liquid hourly space velocity of approximately 30; said conditions being insufficient to cause a substantial reduction in the research octane rating of said reformate.

6. A method for improving the stability and cleanliness of gasoline containing thoroughly desulphurized substantially non-olefinic catalytic reformate reformed in the presence of a platinum type catalyst, without significant impairment of its research octane rating, comprising mildly hydrogenating, up to a 60% reduction in bromine number, the effluent stream of reformate in the presence of cobalt molybdate catalyst and in the absence of added olefins.

7. The method of claim 6 wherein the hydrogen is obtained by passing the effluent stream directly to the hydrogenation while it contains hydrogen resulting from the catalytic reformation.

8. The method of claim 6 wherein hydrogen is added separately to the effluent containing negligible amounts of hydrogen, at the hydrogenation step.

9. The method of claim 6 wherein the reformer effluent is fractionated prior to hydrogenation to remove bottoms and obtain a desired end point.

10. The method of claim 6 wherein the hydrogenator effluent is fractionated subsequent to hydrogenation, to remove bottoms and obtain a desired end point.

11. A method for improving the stability and cleanliness of gasoline containing catalytic reformate of negligible olefin content, without significant impairment of its research octane rating, comprising cooling the effluent stream of reformate from a catalytic reformer to about 450°–600° F. and passing it with its contained hydrogen directly without added olefins through a bed of cobalt molybdate catalyst at a liquid hourly space velocity of about 30, to obtain a net hydrogen consumption at said bed of about 20–30 s.c.f./bbl.

References Cited in the file of this patent

UNITED STATES PATENTS

| | | |
|---|---|---|
| 2,345,575 | Burk et al. | Apr. 4, 1944 |
| 2,367,365 | Munday et al. | Jan. 16, 1945 |
| 2,458,980 | Cole | Jan. 11, 1949 |
| 2,534,025 | Howes et al. | Dec. 12, 1950 |
| 2,542,471 | Brandon | Feb. 20, 1951 |
| 2,740,751 | Haensel | Apr. 3, 1956 |
| 2,877,172 | Morbeck et al. | Mar. 10, 1959 |